(12) United States Patent
Chaudhary et al.

(10) Patent No.: US 8,190,897 B2
(45) Date of Patent: May 29, 2012

(54) METHOD AND SYSTEM FOR SECURE EXCHANGE OF DATA IN A NETWORK

(75) Inventors: Renu Chaudhary, San Jose, CA (US); Cynthia M. Jung, Menlo Park, CA (US); Joseph T. Sun, Milpitas, CA (US); Pawan Bhatia, San Jose, CA (US); Christopher G. Cormier, Campbell, CA (US)

(73) Assignee: Motorola Solutions, Inc., Schaumburg, IL (US)

( * ) Notice: Subject to any disclaimer, the term of this patent is extended or adjusted under 35 U.S.C. 154(b) by 871 days.

(21) Appl. No.: 11/955,832

(22) Filed: Dec. 13, 2007

(65) Prior Publication Data
US 2009/0158040 A1 Jun. 18, 2009

(51) Int. Cl.
*H04L 9/32* (2006.01)
(52) U.S. Cl. .......................................... 713/171; 726/15
(58) Field of Classification Search .................... 726/15, 726/5, 11, 14, 23; 370/331, 338; 713/165, 713/171; 380/247, 250
See application file for complete search history.

(56) References Cited

U.S. PATENT DOCUMENTS

| | | | |
|---|---|---|---|
| 7,036,051 B1 * | 4/2006 | Fernandes | 714/55 |
| 7,558,274 B1 * | 7/2009 | Kinsky et al. | 370/395.54 |
| 7,676,838 B2 * | 3/2010 | Choyi et al. | 726/14 |
| 2003/0198221 A1 * | 10/2003 | Kim et al. | 370/389 |
| 2005/0163078 A1 | 7/2005 | Oba | |
| 2006/0095767 A1 | 5/2006 | Krishnamurthi | |
| 2007/0008926 A1 | 1/2007 | Oba | |
| 2008/0155677 A1 * | 6/2008 | Hossain et al. | 726/15 |

OTHER PUBLICATIONS

PCT Search Report Dated May 12, 2009.

* cited by examiner

*Primary Examiner* — Kimyen Vu
*Assistant Examiner* — Suman Debnath
(74) *Attorney, Agent, or Firm* — Valerie M. Davis; Kenneth A. Haas

(57) ABSTRACT

A first network device implements a method for the secure exchange of data in a network. The network also includes a second network device and a remote device. The method includes establishing an indirect path to the remote device and pre-negotiating first security parameters with the remote device over the indirect path using a network layer protocol, when the second network device has an active first data link. The method further includes establishing an active second data link with the remote device and exchanging first data with the remote device over the active second data link using the first security parameters, when the first data link becomes inactive.

15 Claims, 4 Drawing Sheets

METHOD AND SYSTEM FOR SECURE EXCHANGE OF DATA IN A NETWORK

FIELD OF THE INVENTION

The present invention relates generally to the field of networks, and more specifically, to a method and system for secure exchange of data in a network.

BACKGROUND OF THE INVENTION

Information technology has revolutionized the way in which data is exchanged in a computer network among various users. Computer networks deploy network devices such as routers, hubs, switches and bridges to facilitate the exchange of data among users using different sites. A site is a location that provides a starting point or gateway to other resources in the computer network. An example of a site is a web portal. A router located at a site can be referred to as a site router. The site router interacts with a master or central router such as a core router to make a request for data or exchange data with another site router. The core router can exchange data with more than one site router through various data links.

A data link is a communications transmission path or connection between two devices for exchanging data using a data link protocol that packetizes the data for transmission. Each data link may comprise one or more physical links that may be wireline and/or wireless links. A data link protocol is implemented at the data link layer (also commonly referred to as layer 2) of a network interconnect model, such as the well known Open Systems Interconnection (OSI) standard reference model. Examples of data link protocols include, but are not limited to: Point-to-Point protocol (PPP) as described by Internet Engineering Task Force (IETF) Request for Comments (RFC) 1661 to establish PPP data link connections between devices for data exchange over serial cable, phone lines, trunk lines, cellular telephones, specialized radio links, or fiber optic links; and a family of Frame Relay Forum (FRF) data link protocols for fast packet transmission (i.e., lacking error correction) between devices, an example of which is FRF.17 standard protocol.

In the event of a failure in the core router, the physical link of the core router becomes inactive, which may lead to a loss of data being communicated over the data links. To minimize data loss due to the failure of the core router, some networks use a redundancy mechanism that deploys a pair of core routers as active and inactive routers. When the computer network comprises a Wide Area Network (WAN), the router pair is sometimes referred to as Co-operative Wide area network Routers (CWRs). In the router pair, the active router is primarily responsible for data exchange with the various site routers. Further, the inactive router acts as a back-up router on stand-by to be used for data exchange when the active router fails. A relay switch is provided and coupled to each router pair. This relay switch is used to switch control to the inactive router when the active router fails, and vice versa. One advantage of the above redundancy mechanism is that the switching to the new active router usually occurs in well under three seconds and with minimum impact on traffic.

Further, the data exchange between the core and site routers in some networks needs to be secure. To facilitate secure communication in such networks, Security Associations (SAs) are established between the active core router and each of the site routers prior to data exchange. A SA is a relationship established between two network devices that defines security information (also referred to herein as security parameters) used to support secure communication between the two devices, wherein the security information may include, but is not limited to, encryption and authentication keys and algorithms, digital certificates, etc. However, establishing SAs in networks implementing the above-described redundancy mechanism can cause performance problems.

More particularly, in this type of network, only the active router maintains active data links with the site routers. Accordingly, SAs are established between the inactive router and each of the site routers only upon: loss of the data link between the previously active router and the site routers; switchover to the previously inactive router; and establishing active data links between the new active router and the site routers. This is due to certain protocols necessitating an active data link to establish the SAs. For example, the FRF.17 standard defines the use of Frame Relay privacy Protocol (FRPP) to establish the SAs, but FRPP security negotiations can be performed only when a directly connected layer two link is active. This is because FRPP uses an FRF.17 port for FRPP negotiations, and the sole FRF.17 port assigned to the router pair is only used by one of the core routers at a time. The resulting problem is that depending on the number of site routers involved, thereby, needing SAs established with the new core router, the switchover delay may exceed a few seconds and result in increased down time at the site routers.

Therefore, in a network that requires secure communications between an active router and various site routers, there exists a need for a mechanism that provides upon failure of the active router a resumption of the secure exchange of data between the inactive router and the site routers, which addresses at least some of the shortcomings in the prior art.

BRIEF DESCRIPTION OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
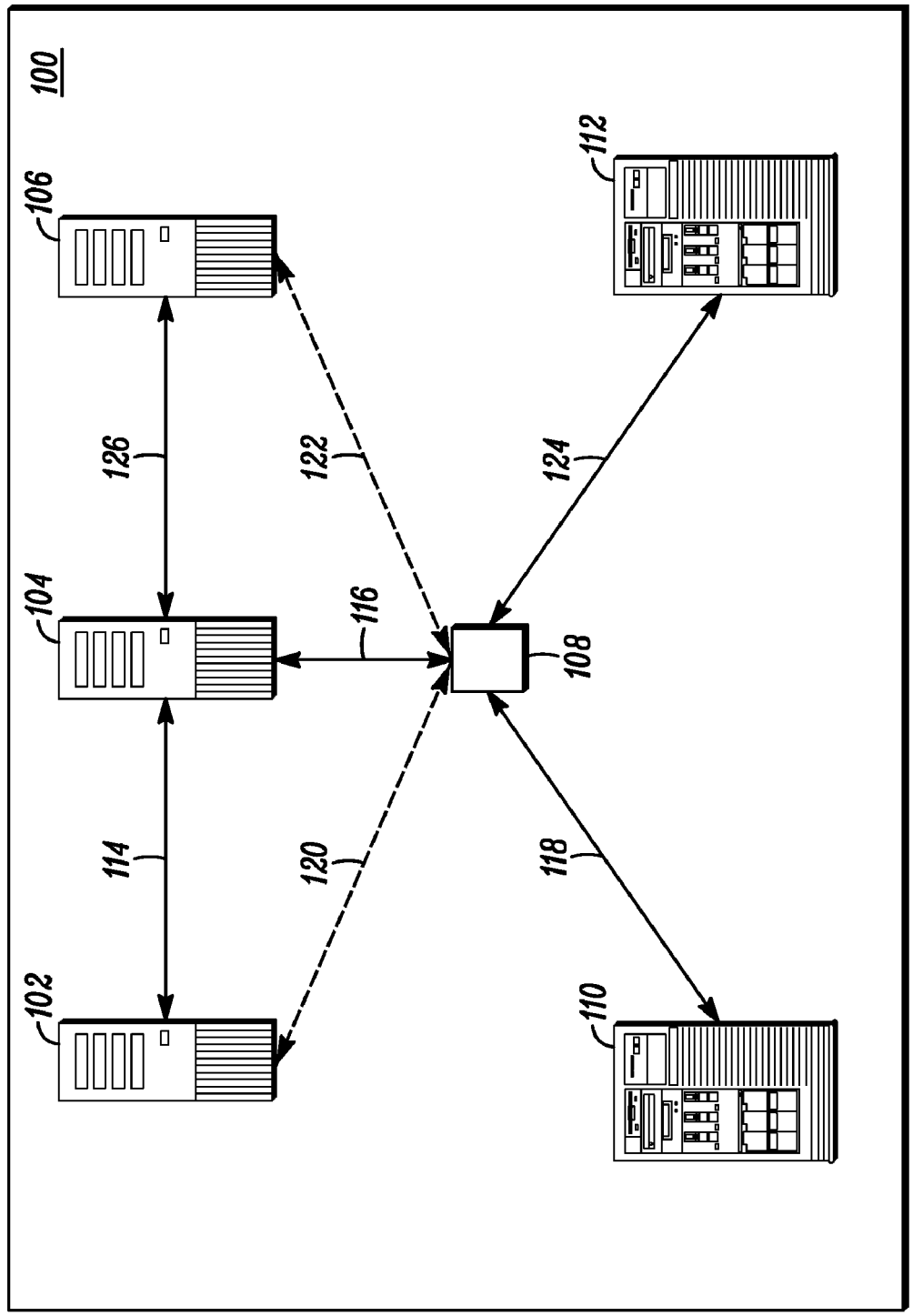
FIG. 1 illustrates a schematic diagram of a network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION OF THE INVENTION

Generally speaking, pursuant to the various embodiments, a first network device and a method are used to establish secure exchange of data in a network. The network includes the first network device, a second network device and a remote device. The first network device utilizes an indirect path to perform pre-negotiations of security parameters with the remote device using a network layer protocol, when the remote device has an active data link with the second network device. Accordingly, when the data link with the second network device becomes inactive, the first network device can securely exchange data with the remote device using the pre-negotiated security parameters. In this manner, the first network device and the method at the first network device can facilitate the resumption of the secure exchange of data between the first network device and the remote device within, for example, three seconds of the failure of the second network device, in order to maximize availability of the remote device. Those skilled in the art will realize that the recognized advantages mentioned above, and the other advantages described herein, are merely illustrative and are not meant to be a complete rendering of all of the advantages of the various embodiments of the present invention.

Referring now to the drawings, and in particular FIG. 1, an illustrative network 100 in which various embodiments in accordance with the teachings herein can be practiced is shown and indicated generally. The network 100 is an interconnected system of network devices 102, 104, 106, 108, 110 and 112, which are electronic devices that facilitate data communication between users of the network 100. Each network device comprises one or more processing devices and typically a memory storing data and/or software that may be used to program the processing device to perform functions including some functions in accordance with the teachings herein. Each network device further comprises one or more interfaces for connecting to other network devices. Such interfaces may include wireline interfaces (e.g., including various electrical connectors, network cards and ports) and/or wireless interfaces (e.g., including transceiver apparatus and over-the-air interfaces), as is well known in the art. The data can be any form of digital information, for example, databases, music, songs, pictures, movies, source codes, computers programs, and software.

Those skilled in the art, however, will recognize and appreciate that the specifics of this illustrative example are not the specifics of the invention itself and that the teachings set forth herein can be applicable in a variety of alternative settings. For example, since the teachings described do not depend on the type of network devices deployed and likewise don't depend on the type of network implemented, they can be applied to any type of network device in any type of network, although routers and a switch deployed in a Wide Area Network (WAN) are described in the following embodiment. As such, other alternative implementations of using different types of networks and network devices are contemplated and are within the scope of the various teachings described.

Examples of the network 100 include, a Local Area Network (LAN), a WAN, a satellite network, a wireless network, a wireline network and similar other networks. Examples of network devices can include, but are not limited to, hubs, switches, bridges, routers for a website, servers and the like, without departing from the teachings herein. Moreover, network 100 may comprise any number of network devices required for a given commercial implementation, although only six such network devices are shown for ease of explanation.

In this embodiment, network 100 comprises a WAN, wherein network devices are connected via a hub and spoke hierarchy. Namely, network devices 102, 104 and 106, which in this implementation are core routers, are the hubs and facilitate data exchange between a plurality of remote devices 110 and 112 (the spokes), which in this implementation are site routers. The core routers can, for example, be configured in such a way as to perform load sharing to route data between the various remote devices. Moreover, the core routers establish data links with the site routers for data communication using a data link protocol, which in this case is the FRF.17 protocol.

Further in this implementation, network device 108 comprises a relay switch that channels incoming data from any of multiple input ports (from the remote devices) to the specific output port (core router) that will take the data toward its intended destination. Network device 108 may be, for example, an Ethernet switch. As the terms are used herein, a relay switch performs a layer 2 function in that it simply looks at each packet or data unit and determines from a physical address (the Medium Access Control (MAC) address) to which device a packet is intended and switches it out toward that device. A router performs a network layer (or layer 3 of the OSI model) function in that it determines from Internet Protocol (IP) addresses in the packets the destination of the packets and forwards them accordingly. A remote device is simply a device connected by a layer 2 (data) link to another device.

The core routers exchange data with the site routers over links 114, 116, 118, 120, 122, 124 and 126. The links comprise physical resources (i.e., wireline and/or wireless) over which the data is sent and can comprise various kind of connections between the different devices in the network 100. For example, the links can comprise data links, Transparent LANs (TLANs), etc., depending on the type of protocol used for the data transport. In this embodiment, core routers 102, 104 and 106 are interconnected via TLANs. Moreover, in this embodiment, data is exchanged only after security associations are established between the core routers and the remote devices and security parameters are negotiated in order to secure the data exchange. The security associations are established using a cryptographic protocol, examples of which include, but are not limited to Internet Key Exchange (IKE) protocol, Frame Relay privacy Protocol (FRPP), Extensible Authentication Protocol (EAP), etc.

Further in this embodiment, the core routers are deployed as CWR pairs. For example, the core router 102 and the core router 104 can form a router pair of an active and inactive router, or the core router 104 and the core router 106 can form a router pair of the inactive and active routers. However, any number of active/inactive CWR pairs can be deployed in a network implementation. For purposes of the present discussion, the core routers 102 and 106 are each initially an inactive CWR, and the network device 104 is initially an active CWR. As such, core routers 102 and 106, respectively, have inactive data links 120 and 122 to site routers 110 and 112 (illustrated by dashed lines), and core router 104 has an active data link 116, 118 and 124 to site routers 110 and 112 for data transmission. In accordance with the use of the FRF.17 protocol, the active CWR and the inactive CWR share a port, which is used to connect one of the CWR pair at a time to the site routers to exchange data with the site routers over the active data links. Since data is exchanged using the FRF.17 protocol, the WAN port can be referred to as an FRF.17 port, and the FRF.17 port is reachable by an associated IP address.

The active data links 116, 118 and 124 between the active CWR 104 and the site routers 110, 112 are used to establish SAs between these network devices prior to data exchange. For example, in an embodiment, FRPP is used to establish the SAs using the active data links. However, in conventional systems SAs between the inactive routers (e.g., 102, 104) are not established until: an active router fails; these routers become active routers; and their associated links 120, 122 become active data links. By contrast, in accordance with embodiments herein, the SAs between an inactive router and the site routers can be pre-negotiated while the router is still an inactive router and even though is has no direct active data link with the site routers. A core router has a direct active data link with the site routers when the switch 108 directs traffic from the site routers to that particular core router.

Figure 2:
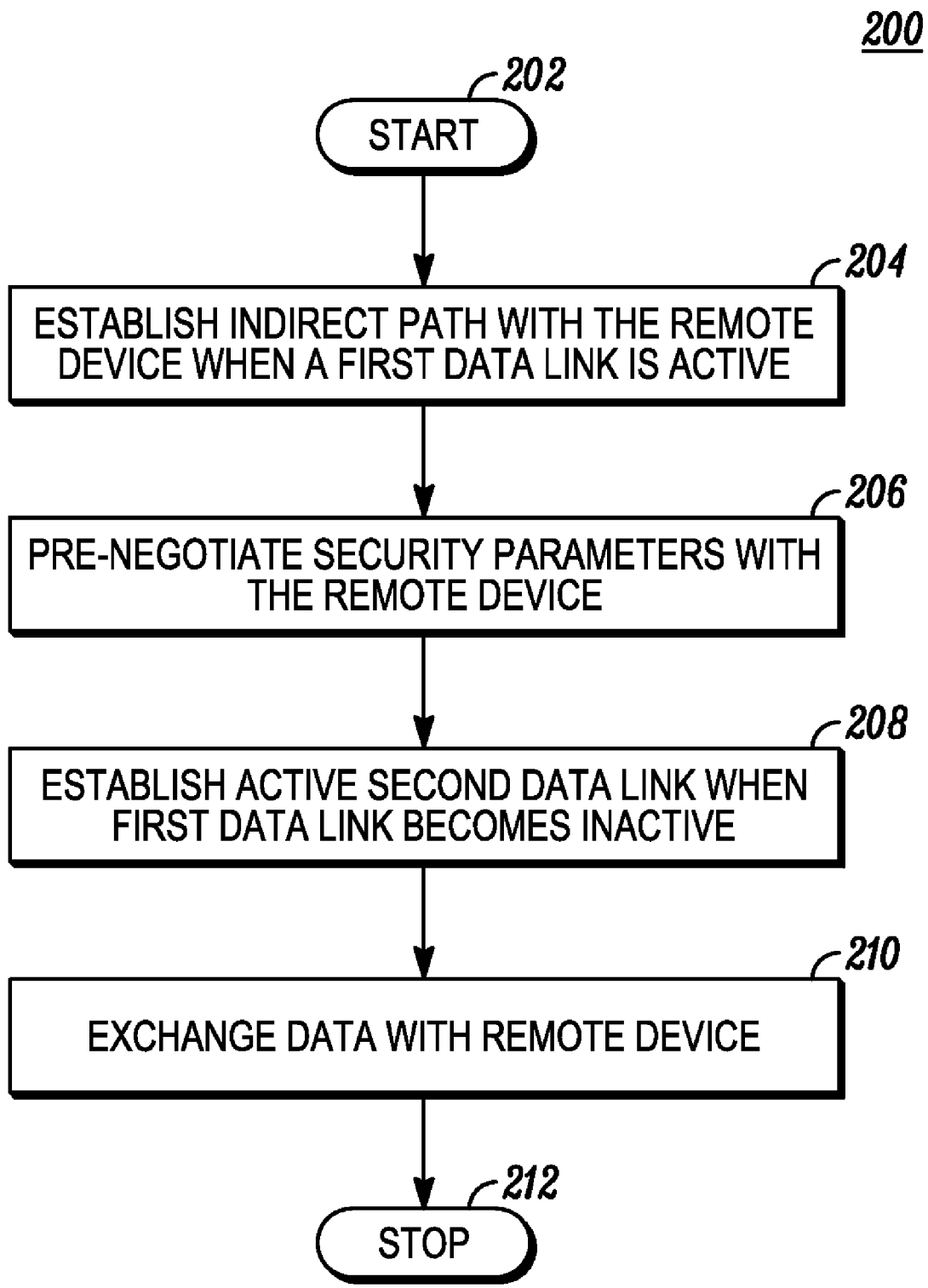
FIG. 2 illustrates a flow diagram of a method for secure exchange of data in accordance with some embodiments.

Turning now to FIG. 2, a flow diagram, in accordance with embodiments herein, is shown and generally indicated as describing a method for the secure exchange of data in a network. To describe the method, references are made to FIG. 1, although it is apparent that the method can also be implemented in any other suitable network. In general, the method at an inactive CWR (e.g., 102) comprises: when a second network device (e.g., 104) has an active first data link (e.g., 116) with a remote device (e.g., 110), establishing (204) an indirect path to the remote device 110 and pre-negotiating (206) security parameters with the remote device 110 over the indirect path using a network layer protocol; and when the first data link (116) becomes inactive, establishing (208) an active second data link (e.g., 120) with the remote device (110) and exchanging (210) data with the remote device (110) over the active second data link (120) using the pre-negotiated security parameters. The above-described functionality may be performed, at least in part, in the processing device of the CWR 102, including encrypting the data using the pre-negotiated security parameters prior to using an interface to send the secure data over the active data link 120 to the remote device 110. Likewise, upon the interface receiving encrypted data from the remote device 110 over the active data link 120, the processing device can use the pre-negotiated security parameters to decrypt the data.

Accordingly, the method initiates at 202 when the inactive CWR is in the standby state and the active CWR is active. At 204, the inactive CWR establishes an indirect path to pre-negotiate security parameters with each site router when the active CWR has the active data link with the site routers. The indirect path is further described in detail below with respect to FIG. 3. At 206, the inactive CWR pre-negotiates the security parameters with the site routers over the indirect path. The security parameters can include, but are not limited to, encryption and authentication keys and hash/encryption algorithms that are pre-negotiated by using the indirect path. When the active CWR fails, the relay switch 108 switches the connections of the ports of the active CWR to the ports of the inactive CWR. Since the inactive CWR already has pre-negotiated security parameters, it is ready to exchange data with the site routers as soon as the ports of the inactive CWR are connected to the site router by the relay switch 108. Therefore at 208, when the first data link becomes inactive, the interface of the inactive CWR can establish an active second data link with the site router.

Further, at 210, the inactive CWR can exchange the data with the remote device 110 over the active second data link by using the first security parameters. The inactive CWR has the first security parameters pre-negotiated even before the second data link becomes active, which facilitates secure exchange of the data in under a few seconds to maximize availability of the site routers. The secure exchange of data is accomplished by processing the data using the security parameters, with such processing comprising encryption and decryption of the data. Furthermore, the secure data is exchanged by using the FRF.17 protocol as described in further detail below by reference to FIG. 4.

Figure 3:
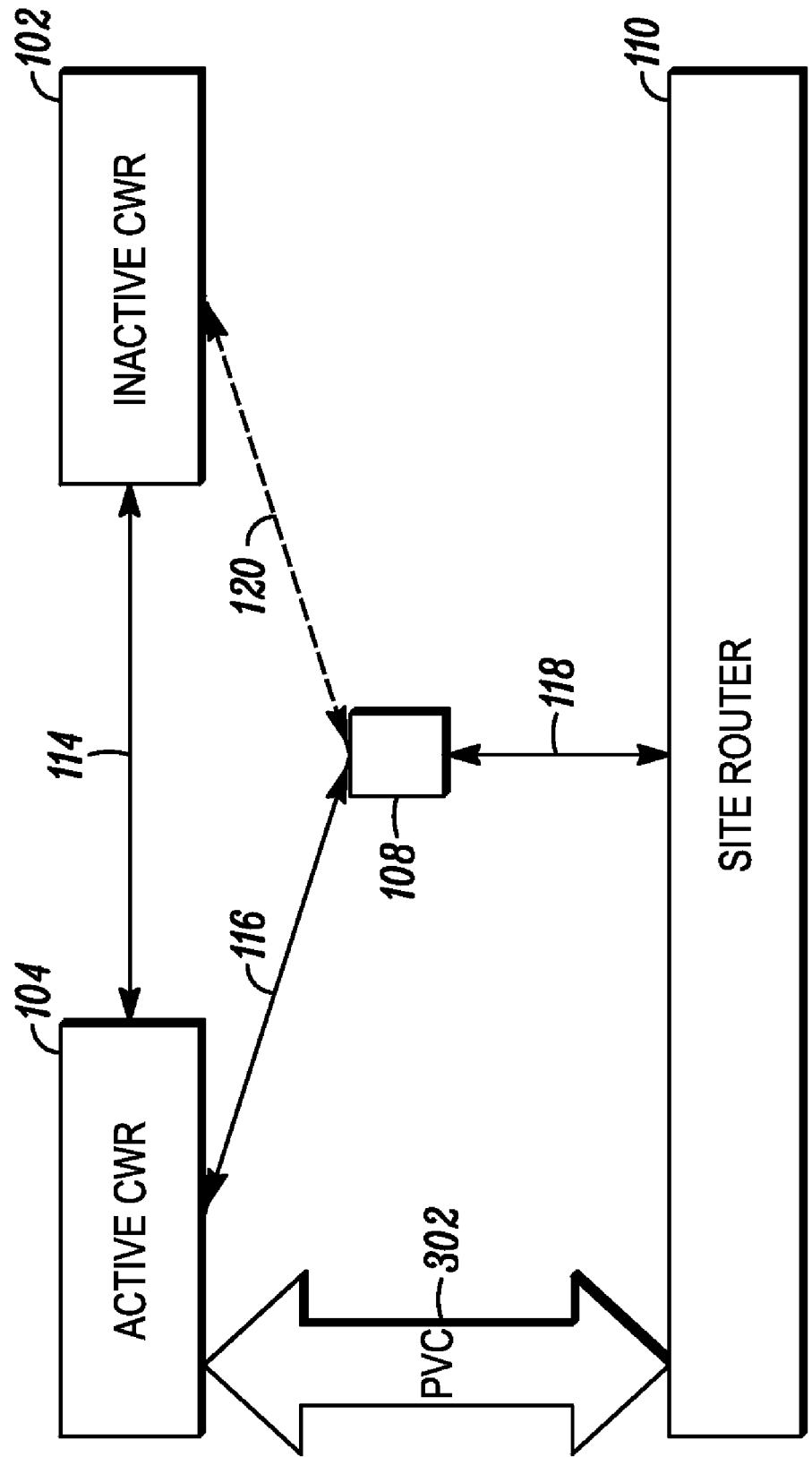
FIG. 3 illustrates a block diagram of a network, in accordance some embodiments, showing a Permanent Virtual Circuit (PVC) of a network device in the network.

Turning now to the FIG. 3, a block diagram of the links between a CWR pair (e.g., initially active router 104 and inactive router 102) and a site router (e.g., 110) including an illustrative PVC 302 between the active CWR 104 and the site router 110, in accordance with embodiments herein, is shown and generally indicated. Further described by reference to FIG. 3 is functionality that occurs upon failure of the active CWR 104 and switchover to the inactive CWR 102.

When the active CWR 104 is functional, the PVC 302 is present between the active CWR 104 and the site router 110 and can be used to negotiate the security parameters between the active CWR 104 and the remote device 110. A PVC is a software-defined logical connection ('virtual' path) in a frame relay network. A feature of frame relay that makes it a highly flexible network technology is that users can define logical connections and required bandwidth between end points, and the frame relay network technology automatically determines how the physical network is used to achieve the defined connections and manage the traffic. In frame relay, the end points and a stated bandwidth called a Committed Information Rate (CIR) constitute the PVC, which corresponds to two frame relay network devices, and, typically, multiple PVCs share the same physical paths at the same time. In this case, a port on the site router 110 and the FRF.17 port assigned to the CWR 104/CWR 102 router pair define the endpoints of the PVC 302. Whereas, data links 118 and 116 comprise the actual connections in the physical network for the PVC 302. Accordingly, the PVC can be switched to the inactive router 102 (when needed) by the switch 108 forwarding traffic from the site router 110 to the router 102 at the FRF.17 port when it becomes the active router, with data links 118 and 120 comprising the actual connections. The seamless switching is, thereby, invisible to the site routers, as they still effectively see the same PVC. In an embodiment T1, E1 or J1 interfaces at the FRF.17 port may be used to couple the routers to the relay switch 108.

In accordance with the teachings herein, security parameters can also be pre-negotiated between the inactive CWR 102 and the site router 110 while the link 120 between the core router 102 and the site router 110 is inactive. Namely, when CWR 104 is the active router and CWR 102 is the inactive router, CWR 102 establishes an indirect path to the site router 110 and establishes a SA with the site router 110 via the indirect path using a network layer protocol. Therefore, the indirect path can also be referred to as a layer-3 alternate route. In this embodiment, the indirect path comprises data link 114 (which is a TLAN) between the CWR 102 and the CWR 104 and the PVC 302 between the CWR 104 and the site router 110. Details of the inactive CWR 102 establishing the SA and pre-negotiating security parameters with the site router 110 are explained next by reference to FIG. 4. Moreover, further explained by reference to FIG. 4 are details of the CWR 102 securely exchanging data with the site router 110 using the pre-negotiated security parameters, upon the CWR 102 becoming the active core router of the router pair.

Figure 4:
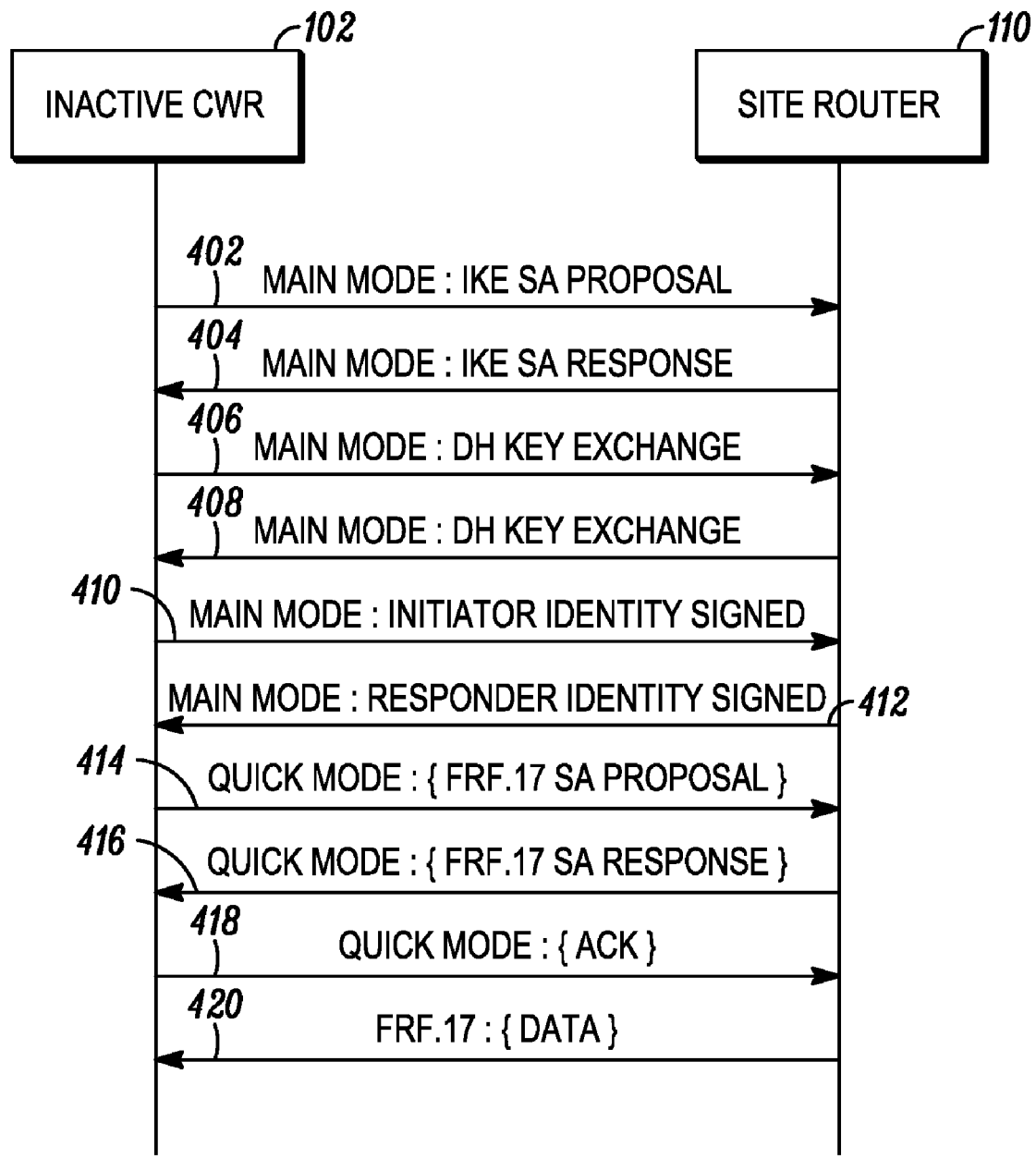
FIG. 4 illustrates a signaling flow diagram in accordance with some embodiments.

Turning now to FIG. 4, a call-flow diagram, in accordance with embodiments herein, is shown and generally indicated to describe a method for secure exchange of data between the inactive CWR and the site router. In accordance with the method, a series of messages are exchanged between the inactive CWR 102 and the site router 110 using a network layer protocol to establish the SA between the two network devices and to pre-negotiate the security parameters. In this embodiment, the network layer protocol used for pre-negotiations is the Internet Key Exchange (IKE) protocol as defined in IETF RFC 2409 and related RFCs. However, it will be apparent to one of ordinary skill in the art that the method can be used with any suitable network layer cryptographic.

The IKE protocol is used to pre-negotiate the security parameters between the inactive CWR 102 and the site router 110 in two phases. The first phase (known in the art as a Main Mode) is performed via messages 402 to 412, and the second phase (known in the art as the Quick mode) is performed via messages 414 to 418. In the Main Mode, a secure and authenticated tunnel or channel is established for communication between the inactive CWR 102 and the site router 110. The secure tunnel is bidirectional and is used for the initial authentication and negotiation of SAs between the inactive CWR and the site router during the Quick Mode. The Quick mode is used to pre-negotiate the security parameters between the inactive CWR and the site router over the secure tunnel. As described above, these security parameters can include encryption and authentication keys and hash/encryption algorithms for later exchange of data (420) between the CWR 102 and the site router 110, upon the CWR 102 becoming the active core router.

An advantage of using a network layer protocol, such as IKE, is that negotiation of the security parameters between the CWR 102 and the site router 110 no longer requires a direct active data link between these two network devices. This is because IKE messages are routable through alternative paths in the network, even when the layer 2 link is down. Moreover, use of the IKE protocol provides for a more robust negotiation and exchange of security parameters than provided by FRPP. For example, IKE: uses a Diffie-Hellman algorithm to exchange session keys; supports two methods for pre-negotiating security parameters, i.e., a Pre-Shared Key (PSK) or a Digital Certificate; and provides for dynamically generated keys that can be updated during the Quick Mode based on, e.g., a user defined configurable time or volume of data. By contrast, FRPP uses a weaker password based authentication, and the encryption keys are pre-configured on the router and do not change from session to session. Therefore, in an embodiment, the active CWR 104 also negotiates the security parameters with the site routers in a manner that is similar to that of the pre-negotiations between the inactive CWR 102 and the site router 110. The Main Mode and the Quick Mode of the IKE protocol are further described below in detail.

Messages 402 and 404 negotiate policy between the inactive CWR and the site router, which include, but are not limited to, an encryption algorithm, a hash algorithm, an authentication method and information about a group over which to do Diffie-Hellman. Messages 406 and 408 provide for a Diffie-Hellman exchange, wherein Diffie-Hellman public values and ancillary data are exchanged. Messages 410 and 412 authenticate the Diffie-Hellman exchange, wherein the inactive CWR and site router identities are authenticated (signed) using the negotiated policy including the negotiated authentication method. The negotiated authentication method may be, for instance, a PSK or a Digital Certificate.

Messages 414, 416 and 418 comprise the SA negotiations to derive the security parameters (including key material) used for the secure data exchange (420) over the active data link 120 using the FRF.17 protocol. Message 418 acknowledges successful completion of the security parameter pre-negotiations between the inactive CWR and the site router 110. The messages 414 and 416 are encrypted/decrypted using information generated by the authenticated Diffie-Hellman exchange. The security parameters generated in the Quick Mode comprise a pair of session keys, one for each direction. The key used for encryption of data by an initiator is the decryption key for a responder, and vice versa, for the data exchange session 420. There is also an option for re-keying or refreshing the session keys while the data exchange session 420 is active. As stated earlier, the re-key can be based on a timer or on volume of data. For example, re-keying can be performed when the volume of data exchanged exceeds some pre-set threshold.

As mentioned above, because of the advantages of using the IKE protocol for SA negotiations, both the inactive and active CWR routers can use IKE to perform their respective SA negotiations. It is assumed that because of the use of Diffie-Hellman, for instance, unique SAs can be established, respectively, between the inactive CWR and the active CWR that can be further uniquely identifiable. Moreover, it may be desirable that in some cases SA negotiations are performed for both the inactive CWR and the active CWR at the same time. However, a technique is needed to enable the inactive and active routers to be distinguished during their respective SA negotiations since these two network devices share a common FRF.17 port IP address. In addition, it may be desirable to have a technique to enable the site router to know when a switchover has occurred from the active router to the inactive router so that the correct session keys can be used to secure the data exchange. The following embodiments address, at least in part, these shortcomings and challenges.

When using a data link protocol for the data exchange, the data is divided by a sending device into frames (data units) having a size or length in accordance with the specifics of the data protocol being used. Moreover, at least one header is usually appended by the sending device to a beginning of each data frame, which contains information to assist a receiving device in processing the frame to extract the data contained therein. Where the FRF.17 protocol is used, as described herein, the frames are referred to as FRF.17 frames and the headers are referred to as FRF.17 headers. In accordance with the teachings herein, one or more data link headers (e.g., FRF.17 headers) appended to data frames includes information, thereby, generating a new FRF.17 header for implementing the described embodiments. Moreover, the unique FRF.17 header in accordance with the teachings herein may be appended to messages 414, 416, 418 during the Quick Mode to implement further described embodiments.

In one embodiment, ports other than the WAN ports of the CWR pair are identified by a System Internet Protocol (SysIP) address of their respective network devices, which may be assigned by a network administrator. For example, a port other than a WAN port of the active CWR has a SysIP address that corresponds to the active CWR. Further, a port other than a WAN port of the inactive CWR has a SysIP address that corresponds to the inactive CWR and is different than the SysIP address for the active CWR. A remote device can use these different SysIP addresses of the inactive and active CWRs to distinguish these two network devices in different implementations, when the SysIP address is included in a header. Moreover, in other embodiments a Security Parameter Index (SPI) and a sequence number may also be included in a header.

For example in one implementation, a data frame (e.g., an FRF.17 frame) sent over the active second data link 120 can comprise a header (e.g., an FRF.17 header) that includes the SysIP address of the inactive CWR. Furthermore, a data frame sent over the active first data link 116 can include the SysIP address of the active CWR. When the header of data frame that is sent over the active second data link by the inactive CWR is received and decoded by the site router, the site router can use the SysIP address to identify that the header was sent by the inactive CWR. Further, when the header of the data frame that is sent over the active first data link by the active CWR is received by the site router, the site router can use the SysIP address to identify that the header was sent by the active CWR. As a result, the site router can use the SysIP address of the received header to determine whether the first 116 or the second 120 data link is active. This enables the site router to detect when a switchover between the CWR pair has occurred and facilitates the site router identifying the correct session keys to use to encrypt and/or decrypt the data sent over the active data link.

As mentioned above, the header of a data frame (e.g., an FRF.17 frame) can further include a SPI determined by the router, wherein the SPI is used to uniquely identify a given set of security parameters (e.g., session keys). Thus, by knowing the mapping between an SPI and its associated security parameters for a particular network device, the site router is able to use the correct session keys for encryption/decryption, such as during a switchover scenario. Additionally, a sequence number can be included in a header of each data frame to prevent against replay attacks. In such an embodiment, if an authorized device sniffs a packet that has a given sequence number and resends the packet. A receiving device can detect a replay attack by detecting that the sequence number has already been used and processed.

Not only can a SysIP address, SPI and sequence number be included in a data frame header sent over an active data link, these parameters may also be advantageously included in a header appended to the Quick Mode messages 414, 416 and 418. Inclusion of the SysIP address in these messages enables a site router to simultaneously negotiate SAs with both the inactive and active CWR even though they share the same FRF.17 port address. This is because the site router can use the different SysIP addresses to determine from what network device a given message is sent and to correspondingly reply to that particular network device. Moreover, as stated earlier, Quick Mode can be used for re-keying while a data session (420) is still active. After re-key, there is a window of time where the site router and the CWR have two sets of SAs. During this window, a receiver needs to determine which of the two SAs to use to decrypt a received data frame. Including the SPI in the data frame header allows the receiver to correctly identify the proper SA to use. Finally, as with inclusion in a data frame header sent over an active data link, the sequence number can likewise be included in the messages 414, 416 and 418 to prevent against replay attacks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for secure exchange of data in a network described herein. The non-processor circuits may include, but are not limited to, a radio receiver, a radio transmitter, signal drivers, clock circuits, power source circuits, and user input devices. As such, these functions may be interpreted as steps of a method to perform the secure exchange of data in a network described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for secure exchange of data in a network comprising a first network device, a second network device, and a remote device, the method comprising:
   at the first network device:
      when the second network device has an active first data link with the remote device, establishing an indirect path to the remote device and pre-negotiating first security parameters with the remote device over the indirect path using a network layer protocol;
      when the first data link becomes inactive, establishing an active second data link with the remote device and exchanging first data with the remote device over the active second data link using the first security parameters;
      sending a header comprising a System Internet Protocol (SysIP) address that is used by the remote device to identify that the header was sent from the second network device; and wherein the SysIP address is further used by the remote device to determine that the active second data link is with the first network device instead of the second network device.

2. The method as recited in claim 1, wherein the indirect path comprises a Private Virtual Circuit (PVC) of the second network device and a data link between the first network device and the second network device.

3. The method as recited in claim 2, wherein the second network device and the remote device exchange second data over the active first data link using second security parameters that were negotiated between the second network device and the remote device over the PVC of the second network device using the network layer protocol.

4. The method as recited in claim 1, wherein the header further comprises a Security Parameter Index (SPI) that is used by the remote device to identify security parameters to use for exchanging the first data over the active second data link.

5. The method as recited in claim 1, wherein exchanging the first data using the first security parameters comprises encrypting and decrypting the first data using the first security parameters.

6. The method as recited in claim 1, wherein the first data is exchanged using a data link protocol.

7. The method as recited in claim 6, wherein the data link protocol is a Frame Relay Fragmentation (FRF.17) protocol.

8. The method as recited in claim 1, wherein the network layer protocol is an Internet Key Exchange (IKE) protocol.

9. The method as recited in claim 8, wherein the IKE protocol uses a Digital Certificate or a Pre-Shared Key (PSK) for pre-negotiating the first security parameters.

10. The method as recited in claim 1, wherein pre-negotiating the first security parameters comprises:
    establishing a secure tunnel by performing initial authentication with the remote device;
    pre-negotiating the first security parameters with the remote device over the indirect path using the secure tunnel.

11. A first network device in a network further comprising a second network device and a remote device, the first network device comprising:
    a processing device pre-negotiating first security parameters with a remote device by establishing an indirect path to the remote device when the second network device has an active first data link with the remote device, wherein the first security parameters are pre-negotiated using a network layer protocol;
    an interface for exchanging first data with the remote device over an active second data link using the pre-negotiated first security parameters, wherein the active second data link is established with the remote device when the first data link becomes inactive
    a data link for sending a header comprising a System Internet Protocol (SysIP) address that is used by the remote device to identify that the header was sent from the second network device; and wherein the SysIP address is further used by the remote device to determine that the active second data link is with the first network device instead of the second network device.

12. The first network device of claim 11, wherein the first network device is a core router in a Wide Area Network.

13. The first network device of claim 11, wherein the interface is coupled to a relay switch that establishes the active second data link with the remote device when the first data link becomes inactive.

14. The first network device of claim 11, wherein the processing device pre-negotiates the first security parameters through Internet Key Exchange (IKE) protocol using a Digital Certificate or a Pre-Shared Key (PSK).

15. The first network device of claim 11, wherein the processing device uses the pre-negotiated first security parameters to encrypt and decrypt the first data while exchanging the first data with the remote device.

* * * * *